(12) United States Patent
Park

(10) Patent No.: US 7,747,868 B2
(45) Date of Patent: Jun. 29, 2010

(54) METHOD FOR INPUTTING A PASSWORD IN A MOBILE COMMUNICATION TERMINAL

(75) Inventor: Hong-Ju Park, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 1134 days.

(21) Appl. No.: 10/314,773

(22) Filed: Dec. 9, 2002

(65) Prior Publication Data

US 2003/0110402 A1 Jun. 12, 2003

(30) Foreign Application Priority Data

Dec. 7, 2001 (KR) ................................ 2001-77491

(51) Int. Cl.
*G06F 21/00* (2006.01)
(52) U.S. Cl. .......................... 713/183; 713/182; 726/2; 455/410
(58) Field of Classification Search ............. 726/16–19, 726/34, 2, 4, 6, 21, 5, 27, 28; 713/182–184, 713/185, 186; 455/410, 411; 341/21–28, 341/34; 715/741, 536; 345/168; 379/355.07; 235/60.18, 379, 380, 381, 382
See application file for complete search history.

(56) References Cited

U.S. PATENT DOCUMENTS

| | | | | |
|---|---|---|---|---|
| 4,868,779 A | * | 9/1989 | Seto | 715/536 |
| 5,928,364 A | * | 7/1999 | Yamamoto | 726/18 |
| 6,005,498 A | * | 12/1999 | Yang et al. | 341/23 |
| 6,043,760 A | * | 3/2000 | Laakkonen | 341/22 |
| 6,172,625 B1 | * | 1/2001 | Jin et al. | 341/67 |
| 6,643,371 B2 | * | 11/2003 | Mager | 379/355.07 |
| 6,643,784 B1 | * | 11/2003 | McCulligh | 726/18 |
| 6,674,372 B1 | * | 1/2004 | Ouyang | 341/28 |
| 6,747,676 B2 | * | 6/2004 | Botz et al. | 715/741 |
| 6,822,585 B1 | * | 11/2004 | Ni et al. | 341/28 |
| 6,848,083 B2 | * | 1/2005 | Shen | 715/863 |
| 7,420,478 B2 | * | 9/2008 | Wormald | 341/23 |
| 2004/0178881 A1 | * | 9/2004 | Otsubo et al. | 340/5.54 |

FOREIGN PATENT DOCUMENTS

WO PCT/JP01/04186 * 5/2001

* cited by examiner

*Primary Examiner*—Kimyen Vu
*Assistant Examiner*—Nirav Patel
(74) *Attorney, Agent, or Firm*—The Farrell Law Firm, LLP

(57) ABSTRACT

A method for inputting a password in a mobile communication terminal. A password character table is provided to pre-store a plurality of special characters corresponding respectively to a number of key inputs. Displayed on a display screen is a special character in the password character table corresponding to the number of inputs of a given character key in a password input mode.

6 Claims, 4 Drawing Sheets

US 7,747,868 B2

METHOD FOR INPUTTING A PASSWORD IN A MOBILE COMMUNICATION TERMINAL

PRIORITY

This application claims priority to an application entitled "METHOD FOR INPUTTING PASSWORD IN MOBILE COMMUNICATION TERMINAL", filed in the Korean Industrial Property Office on Dec. 7, 2001 and assigned Serial No. 2001-77491, the contents of which are hereby incorporated by reference.

BACKGROUND OF THE INVENTION

1. Field of the Invention

The present invention relates to a mobile communication terminal, and more particularly to a method for inputting a password in a mobile communication terminal.

2. Description of the Related Art

Commonly, a mobile communication terminal has a plurality of keys, about twelve ones of which can be assigned characters. In Korea, one number, two or three English characters and Korean consonants or vowels are assigned to each of the keys in the mobile communication terminal. These keys will hereinafter be referred to as character keys. The mobile communication terminal generally has a keypad including such character keys, as illustrated in FIG. 1. FIG. 1 illustrates a conventional keypad configuration. Any one of characters assigned to one character key can be input by pressing the character key one time or repeatedly. For example, in order to input an English character 'K' to the mobile communication terminal through a key (hereinafter referred to as a "key 5") assigned three English characters 'J', 'K' and 'L', two Korean consonants 'ㄴ' and 'ㄹ' and a number '5', a user has to successively input the key 5 twice in an English character input mode. At this time, a control unit of the terminal displays the English character 'K' as desired by the user on a display screen of the terminal by recognizing the type of the inputted character key and counting the number of inputs of that key. That is, in response to the first input of the key 5, the control unit displays 'J' on the display screen. Subsequently, upon receiving the second input of the key 5 within a predetermined period of time from the first input, the control unit changes 'J' to 'K' and then displays 'K' on the display screen. The user can identify the inputted characters by viewing the displayed characters.

Such a character input method may be also applied in the same manner to the input of a password. However, when a password is inputted, any character key inputted by the user is generally displayed as a special character * or # on the display screen in order to maintain security. For this reason, when a password with a combination of English characters and Korean characters is inputted, the user cannot identify characters actually being input, nor can the user determine whether the password has been correctly input.

Alternatively, if the mobile communication terminal is constructed to display the input characters without using a special character * or # on the display screen as they are when a password with a combination of English characters and Korean characters is input, security will not be maintained.

SUMMARY OF THE INVENTION

Therefore, the present invention has been made in view of the above problems, and it is an object of the present invention to provide a password input method for enabling a user to identify a currently input character when inputting a password.

It is another object of the present invention to provide a password input method that maintains security when a password is input.

In accordance with the present invention, the above and other objects are accomplished by the provision of a password input method in a mobile communication terminal, the method comprising the steps of: a) configuring a password character table including a plurality of special characters corresponding respectively to a number of inputs of character keys, b) if a character key assigned at least one character is input in a password input mode, counting a number of key inputs, and c) searching the password character table for a special character corresponding to the counted number of key inputs and displaying the searched character on a display screen.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the following description, a detailed description of known functions and configurations incorporated herein will be omitted when it may make the subject matter of the present invention rather unclear.

Figure 1:
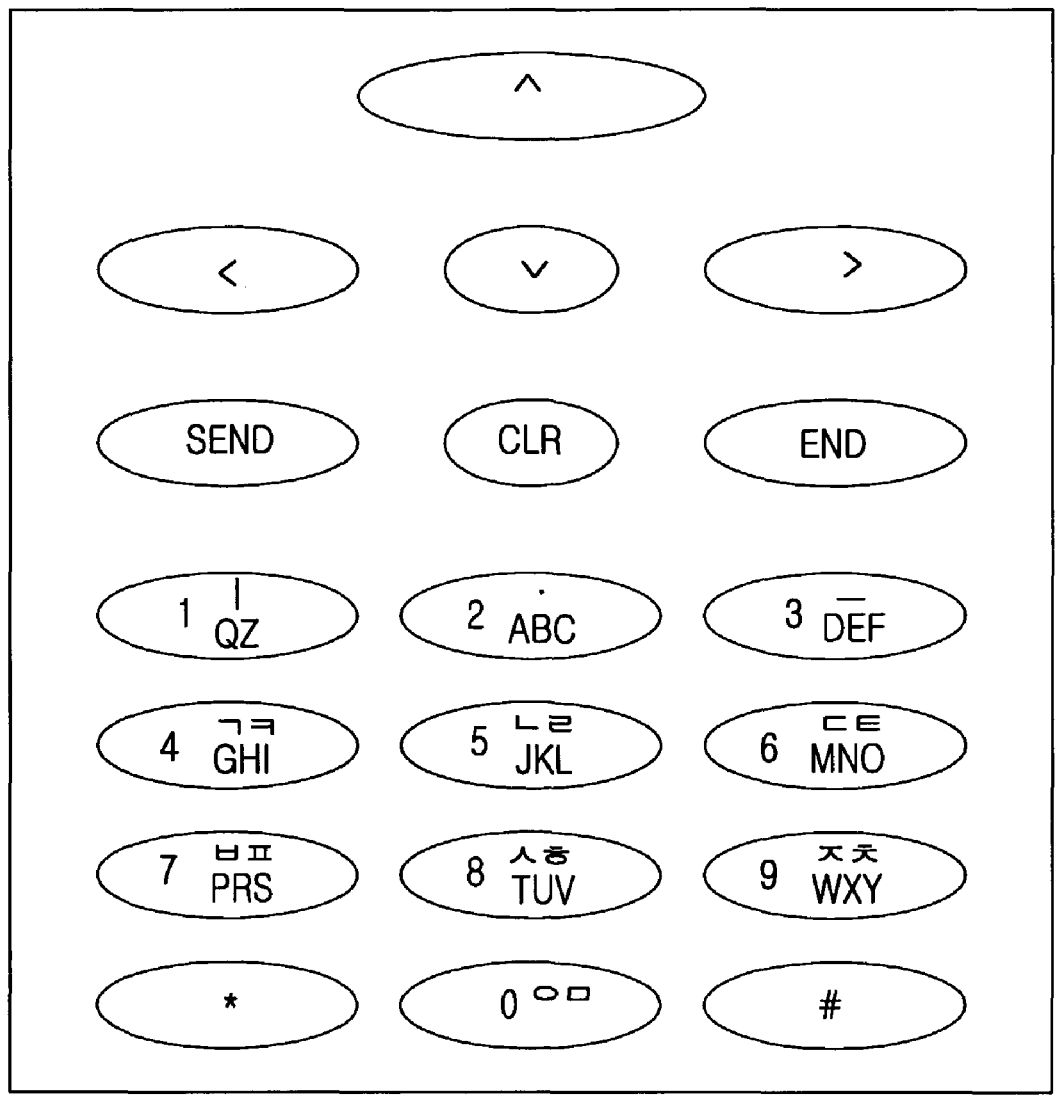
FIG. 1 is a view illustrating a conventional keypad configuration.
Figure 2:
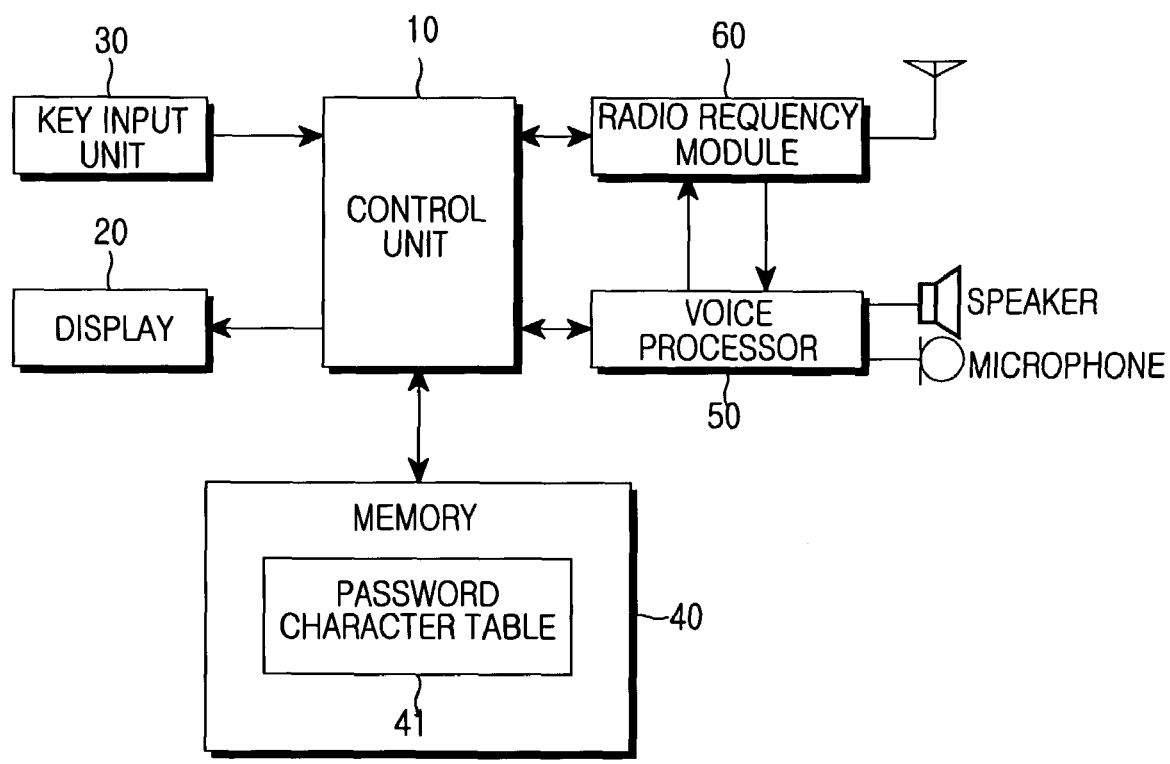
FIG. 2 is a block diagram of a mobile communication terminal to which the present invention is applied.

First, a security-emphasized method for inputting a password in a mobile communication terminal in accordance with the present invention will be described with reference to FIGS. 2, 3, and 4. FIG. 2 is a block diagram illustrating a mobile communication terminal to which the present invention is applied.

As illustrated in FIG. 2, the mobile communication terminal comprises a control unit 10, a display 20, a key input unit 30 and a memory 40.

The control unit 10 performs the entire control operation of the mobile communication terminal. As is such, in the present invention, the control unit 10 controls all operations associated with the input of a password. For example, the control unit 10 counts the number of inputs of a specific character key and measures a key input time interval through a timer. A radio frequency module 60 controls transmission and reception of voice data and control data under the control of the control unit 10. The key input unit 30 includes a plurality of number keys, a plurality of function keys, etc. The key input unit 30 transfers key input data corresponding to a key pressed by a user to the control unit 10. The display 20 displays various messages, etc. under the control of the control unit 10. The memory 40 stores program data necessary for the terminal operation control and data generated during the control operation or operations selected by the user. The memory 40 further stores program data associated with a password input operation and a password character table 41 according to the present invention. The password character table 41 includes a plurality of special characters corresponding respectively to the numbers of key inputs. In other words, the password character table 41 includes a plurality of special characters corresponding respectively to a number of successive inputs of a given key within a predetermined period of time in a password input mode. The following table 1 shows an example of the password character table 41.

TABLE 1

| Idx | 1 | 2 | ... | n |
|---|---|---|---|---|
| Special Character | ♤ | ▽ | ... | ♤ |

In the above table 1, Idx is the number of inputs of a given character key. A first input of the character key, Idx=1, corresponds to a special character ♤ and, a second input of the same character key, Idx=2, corresponds to a special character ▽. In this manner, the password character table has different special characters according to respective Idx values.

If a specific character key is inputted in the password input mode, then the control unit 10 of the mobile communication terminal, which has the password character table as stated above, begins to count the number of inputs of the character key. Then, the control unit 10 drives a timer, determines whether the character key is inputted successively and repeatedly within a predetermined period of time, and updates a current input number count in accordance with the determined result. Thereafter, the control unit 10 displays a special character in the password character table 41 corresponding to the currently counted input number on a display screen.

Next, a description will be given of an operation of the control unit 10 according to the present invention and the associated display states on the display screen with reference to the table 1, FIG. 3, and FIG. 4. FIG. 3 is a flow chart illustrating the operation of the control unit 10 in accordance with the present invention. FIG. 4 illustrates display states on the display screen in accordance with the present invention. For the convenience of description, a character input mode set in the password input mode is assumed to be an English character input mode.

Figure 3:
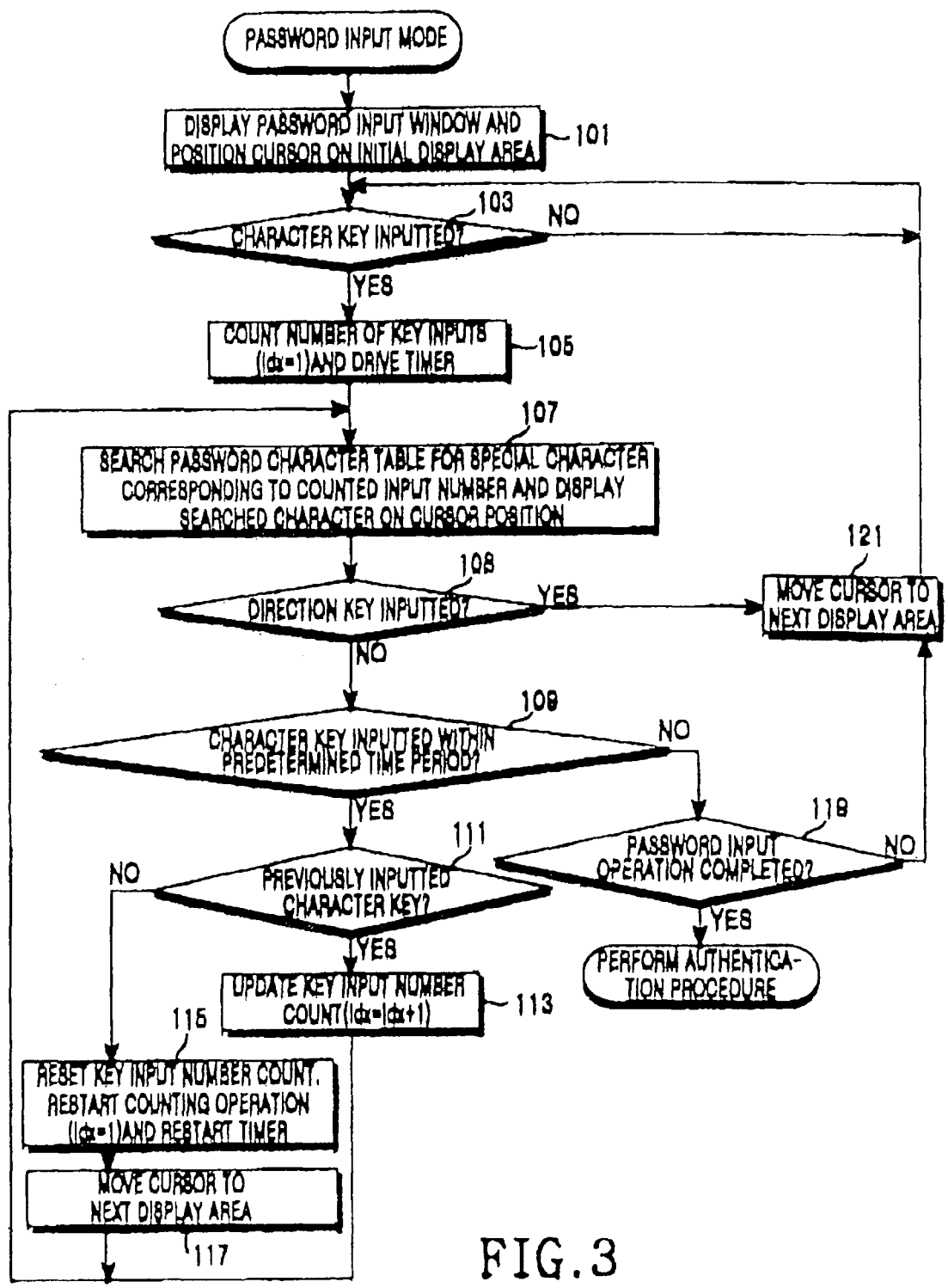
FIG. 3 is a flow chart illustrating an operation of a control unit in accordance with the present invention.
Figure 4:
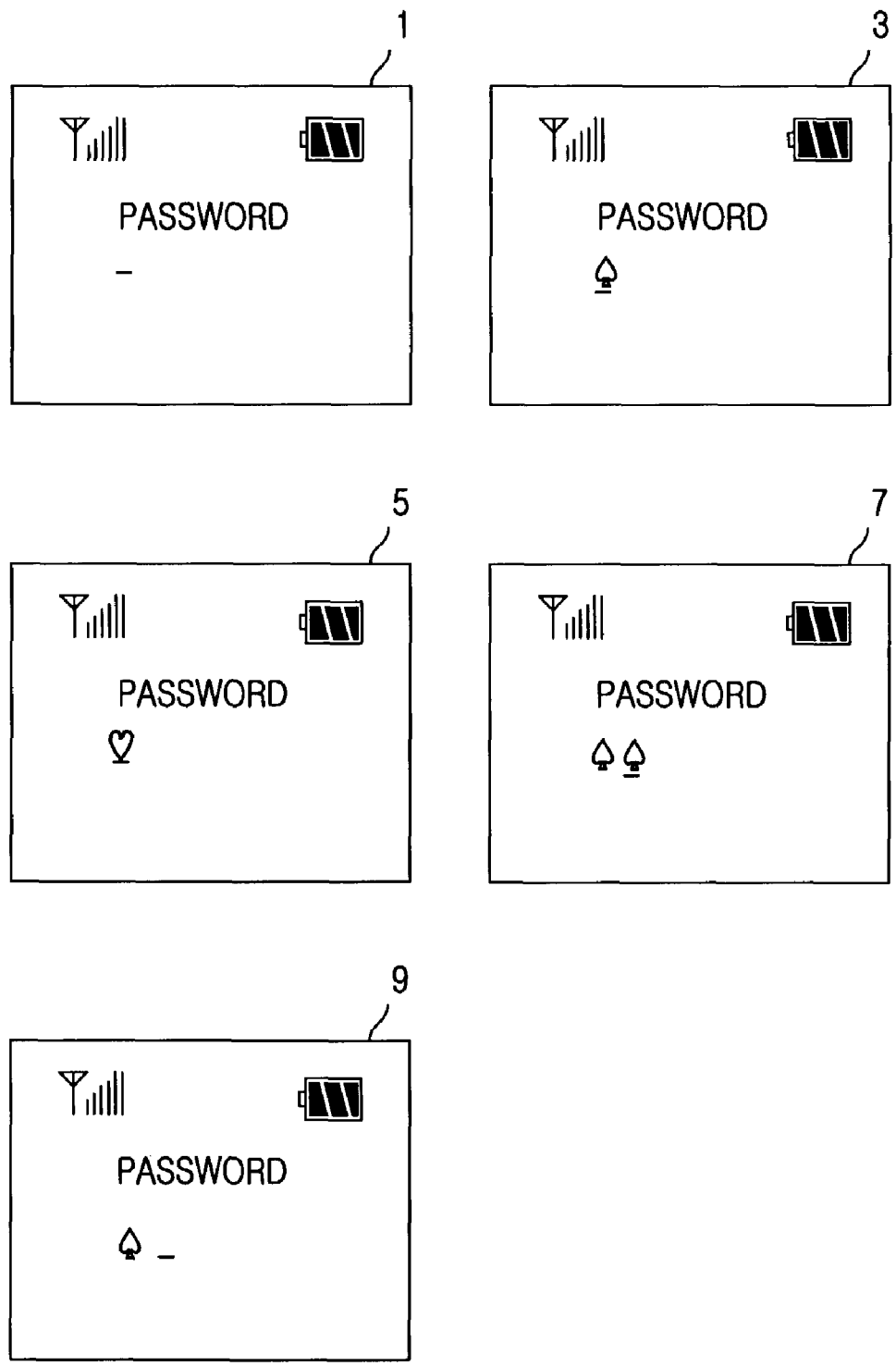
FIG. 4 illustrates display states on a display screen in accordance with the present invention.

With reference to FIG. 3, in the password input mode, the control unit 10 displays a password input window and positions a cursor on an initial display area of the password input window at step 101. This state is illustrated in picture 1 of FIG. 4. The password input mode is provided to request the input of a password from the user to process a user authentication procedure required for execution of a specific function or a data communication function, such as a wireless Internet access, by the mobile communication terminal, or send a password necessary for the authentication procedure. One character is displayed on the above display area.

In step 103, the control unit 10 determines whether an arbitrary character key has been inputted. If an arbitrary character key has been inputted, the control unit 10 proceeds to step 105. In step 105, the control unit 10 begins to count the number of key inputs and drive the timer, and proceeds to step 107. Because the character key has been inputted for the first time, the number of key inputs Idx is 1. Because a plurality of characters assigned to one character key are inputted by successively inputting the same character key within a predetermined period of time, the timer needs to be driven to measure a key input time interval.

The control unit 10 searches the password character table 41 for a special character corresponding to the counted key input number and displays the searched character on the cursor position of the display screen in step 107. Since Idx is 1 in the above step 105, the searched special character is the special character ♤ in the password character table 41 according to the present embodiment. The control unit 10 displays the special character ♤ on the initial display area of the cursor in the first display picture state. This state is illustrated in picture 3 of FIG. 4.

Referring again to FIG. 3, after the above step 107 is performed, the cursor proceeds to step 108. In the step 108, if the user inputs a direction key, the control unit 10 proceeds to the step 121, and if not, the control unit 10 proceeds to the step 109. In the step 121, the control unit 10 moves the cursor to a next display area. In the meantime, the control unit 10 determines in step 109 whether a subsequent character key has been inputted within the predetermined time period, that is, before the timer completes its operation. If a subsequent character key has been inputted, the control unit 10 proceeds to step 111. Otherwise, the control unit 10 proceeds to step 119. The control unit 10 determines in step 111 whether the subsequent character key is the previously input character key or a different character key. The control unit 10 proceeds to step 113 if the subsequent character key is the previously input character key, and to step 115, otherwise. Since the same character key has been successively inputted within the predetermined period of time, the control unit 10 updates the current key input number count at step 113 and then returns to step 107. That is, Idx is incremented by 1 and becomes 2. In step 107, the control unit 10 searches the password character table 41 for a special character corresponding to the updated input number count, displays the searched character on a current cursor position, and repeats the above-described steps. As a result, in the present embodiment, the special character ▽ in the password character table corresponding to Idx=2 is displayed on the initial display area in the display picture. This state is illustrated in picture 5 of FIG. 4.

Meanwhile, if it is determined at step 111 that the subsequent character key inputted in step 109 is a different character key, the control unit 10 proceeds to step 115. In step 115, the control unit 10 resets the current key input number, count to restart the counting operation (Idx=1), restarts the timer and then proceeds to step 117. The control unit 10 moves the cursor to a next display area at step 117 and then returns to step 107. In step 107, the control unit 10 searches the password character table 41 for a special character corresponding to the counted number of key inputs, displays the searched character on the current cursor position, and repeats the above steps, as stated previously. As a result, if a new character key has been inputted in the second display picture state of FIG. 4, the special character ♤ is displayed on each of the initial display area and next display area as illustrated in picture 7 of FIG. 4, in accordance with the present embodiment.

On the other hand, if it is determined at step 109 that no character key has been inputted within the predetermined period of time, in other words, until the driving of the timer is completed, the control unit 10 proceeds to step 119. The control unit 10 determines at step 119 whether the password input operation has been completed. If the password input operation has not been completed, the control unit 10 proceeds to step 121. The control unit 10 moves the cursor to a next display area at step 121 and returns to step 103 to repeat the above-described steps. That is, if no character key has been inputted within the predetermined period of time in the second display picture state, the control unit 10 displays the special character ♤ at the initial display area as illustrated in picture 9 of FIG. 4 and returns to step 103 to wait for a character key to be inputted.

On the other hand, if it is determined at step 119 that the password input operation has been completed through the above-described steps, the control unit 10 performs the user authentication procedure.

As is apparent from the above description, a password input method according to the present invention provides a password character table for pre-storing a plurality of special characters corresponding respectively to a number of key inputs. Displayed on a display screen is any one of the special keys in the password character table corresponding to the number of inputs of a given character key in a password input mode. Therefore, the present invention enhances security and convenience for a user when a password is input.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile communication terminal providing secure password input, the mobile communication terminal comprising:
    a display for displaying information to a user;
    a key input unit including a plurality of keys, each of the plurality of keys being assigned at least one character for character entry on the display;
    a password character table including a plurality of special password characters, which are other than language characters, corresponding respectively to a number of key presses for any of the plurality of keys, such that a same number of presses of any of the plurality of keys will correspond to a same special password character among the plurality of special password characters; and
    a control unit for, during a password entry, counting a number of times that one of the plurality of keys is pressed, searching the password character table for a special password character corresponding to the counted number of times that the one of the plurality of keys is pressed, and displaying the searched special password character on the display instead of the at least one character corresponding to the one of the plurality of keys that was pressed,
    wherein, during password entry, a first special password character is displayed when a first key among the plurality of keys is pressed, and the displayed first special password character changes as the first key among the plurality of keys is successively inputted before a second key different from the first key among the plurality of keys is pressed, wherein identical special password characters are displayed when the first key or the second key is pressed, if the number of presses of the first key and the second key are equal, and
    wherein different special password characters are displayed when the first key or second key is pressed, if the number of presses of the first key and the second key are not equal.

2. The mobile communication terminal of claim 1, wherein the control unit displays a special password character corresponding to the number of presses each time a key press is input.

3. The mobile communication terminal claim 2, wherein the number of presses is increased by 1, when a same key is reinput within a predetermined period of time from a previous input.

4. A method for securely inputting a password in a mobile communication terminal including a display, a key input unit, a password character table, and a control unit, the method comprising:
    receiving, by the mobile communication terminal during a password entry, at least one key press from one of a plurality of keys of the key input unit, each of the plurality of keys being assigned at least one character for character entry on the display;
    searching, by the control unit, the password character table for a special password character corresponding to the key pressed from the plurality of keys; and
    displaying the searched special password character on the display instead of the at least one password character corresponding to the key pressed from the plurality of keys,
    wherein the password character table includes a plurality of special password characters, which are other than language characters, corresponding respectively to a number of key presses for any of the plurality of keys, such that a same number of presses of any of the plurality of keys will correspond to a same special password character among the plurality of special password characters,
    wherein, during password entry, a first special password character is displayed when a first key among the plurality of keys is pressed, and the displayed first special password character changes as the first key among the plurality of keys is successively inputted before a second key different from the first key among the plurality of keys is pressed, wherein identical special password characters are displayed when the first key or the second key is pressed, if the number of presses of the first key and the second key are equal, and
    wherein different special password characters are displayed when the first key or second key is pressed, if the number of presses of the first key and the second key are not equal.

5. The method of claim 4, wherein a special password character is displays corresponding to the number of presses each time a key press is input.

6. The method of claim 5, wherein the number of presses is increased by 1, when a same key is reinput within a predetermined period of time from a previous input.

* * * * *